Jan. 12, 1965   J. W. CLAUSE   3,165,265
LIGHT REFLECTOR
Filed March 2, 1960

INVENTOR.
JOHN W. CLAUSE
BY
ATTYS.

United States Patent Office 3,165,265
Patented Jan. 12, 1965

3,165,265
LIGHT REFLECTOR
John W. Clause, Kent, Ohio, assignor to W. J. Ruscoe Company, Akron, Ohio, a corporation of Ohio
Filed Mar. 2, 1960, Ser. No. 12,355
4 Claims. (Cl. 240—103)

This application is a continuation-in-part of my prior application Serial No. 717,463, filed February 25, 1958, now abandoned.

This invention relates to a novel and improved light reflector, and especially to a reflector including a metal base sheet having a plastic film covering one surface thereof and providing a reflective metal surface on the base sheet.

Heretofore there has been wide commercial use of metal sheets in various light and/or heat reflecting installations. One widely used light reflector unit today is made from an aluminum base sheet having a special, highly reflective, non-oxidizable face surface thereon which retains high light reflective properties over long periods of use. However, such special aluminum sheets are of relatively high cost and are relatively difficult to produce, it is understood. Other light reflective units in service today may comprise steel or other metal base sheets having chromium, cadmium, or other special metallic surfaces plated or otherwise provided thereon. These special metal surfaces can be highly polished, or be otherwise finished in order to provide effective light reflection or non-oxidizable surfaces over long service lives. However, again the cost of making such special metal finishes on a metal base sheet is relatively high and even these special metal finishes may not provide attractive, useful surfaces for extended periods.

It is a general object of the present invention to provide a novel light reflector article or sheet characterized by the provision of a light reflective surface on the metal base sheet by a transparent plastic sheet or film, having a light reflective metal film secured thereto, covering the face of the base sheet.

Another object of the invention is to secure a transparent or translucent polyester film having a reflective aluminum film on the back surface thereof to any suitable metal base sheet by a thermosetting resin type of adhesive.

Another object of the invention is to provide a light reflector article or sheet which has a long service life and which has high light reflective properties, which sheet is made from several laminations, the outer one of which is a substantially inert plastic film.

Another object of the invention is to secure a transparent plastic sheet to a metal base sheet by a suitable adhesive bond so that the metal base sheet can be stamped, drawn or otherwise worked without disrupting the plastic film secured to the metal base sheet, or the adhesive bond therebetween.

A further object of the invention is to provide a novel integral unit of a transparent, inert plastic film that has a substantially microscopically thick metal film on the back surface of the plastic film and with the entire sheet of plastic and metal being translucent and passing at least blue light rays therethrough until the plastic-metal unit is secured to a backing sheet at which time the reflective metal surface provides efficient light reflective action.

Yet another object of the invention is to use very small amounts of vacuum deposited metal in building or making light reflectors and where the vacuum deposited metal is deposited under non-oxidizing conditions to form a continuous metal film with a highly reflective surface in contact with the plastic film.

Another object of the invention is to secure a heat stable, transparent plastic film permanently to a metal base sheet by a thermosetting resin type adhesive to provide a reflective unit so that elevated temperatures to which the reflective unit is subjected to in service will not injure or damage the reflective unit even after long periods of use.

The foregoing and other objects and advantages of the invention will be made more apparent as the specification proceeds.

Attention now is particularly drawn to the accompanying drawings, wherein.

When referring to corresponding portions or members shown in the drawings and referred to in the specification, corresponding numerals are used to facilitate comparison therebetween.

While the present invention is particularly directed towards a light reflector unit, it should be realized that the reflector unit of the invention may be used for heat reflecting action or other similar actions, as desired.

Generally speaking, the present invention relates to a light reflector or the like which includes a metal base sheet, a transparent plastic film forming the face surface of the reflector, a reflective metal film bonded to the inner surface of the plastic film, and a nitrile-rubber, thermosetting resin adhesive bonding the plastic film and reflective metal film unit to the metal base sheet whereby the reflective metal film is exposed to and receives light rays striking the transparent plastic film and reflects them back through the surface plastic film layer.

Figure 2:
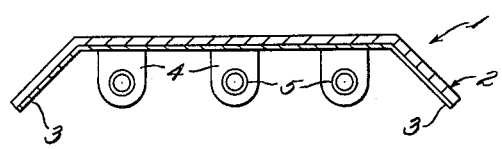
FIG. 2 is a typical section through a light reflector unit of the invention.

Attention now is particularly directed to the details of the structure shown in the drawings, and the light reflector of the invention is indicated as a whole by the numeral 1 and is shown in FIG. 2. This reflector 1 comprises a laminated metal sheet 2 having angularly diverging end portions 3 whereby a contoured, or non-planar reflector is formed. The metal sheet 2 has suitable support brackets 4 secured thereto in any desired manner. These support brackets 4 are of conventional construction and position conventional fluorescent light tubes 5 therein. Other conventional control means, as required, are associated with the reflector 1 for turning the light tubes 5 on and off and starting flow of electricity therethrough. This metal sheet 2 is provided with a special lamination on the face thereof adjacent the light tubes 5.

Figure 1:
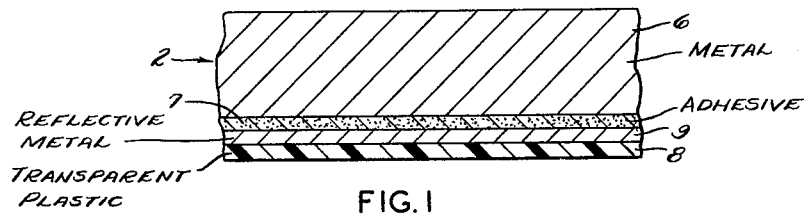
FIG. 1 is an enlarged fragmentary section taken of the laminated body of a light reflector unit of the invention and embodying the principles thereof.

The details of construction of the sheet 2 are best shown in FIG. 1 wherein the sheet 2 is shown to comprise a metal base sheet 6 which has a coating of an adhesive 7 provided thereon. This layer of adhesive 7 effectively bonds a unitary metal and plastic film to the metal base sheet 6. The plastic film unit comprises a sheet of a transparent plastic 8 that has a light reflective metal layer 9 bonded to the inner face thereof.

In making the laminated sheet 2, one would start with the transparent thin plastic film 8, which preferably is made from a material such as an oriented polyester film having a thickness of, for example, about .001 inch, which film may be of the type sold by the Du Pont Company under the trademark of "Mylar." This polyester film is heat set and is of high strength and the molecules therein are oriented. Such film has a working temperature range where it retains all physical characteristics from about minus 80° F. to 290° F., or higher. This transparent film 8 has a very fine layer or film of a reflective metal, such as aluminum, silver and possibly chromium, deposited thereon under vacuum by generally conventional processes such as those set forth in either of U.S. Patents Nos. 2,074,281 or 2,153,786, as modified by the description herein. This vacuum deposited metal film is very thin and is itself flexible so that the composite or laminated plastic and metal film still provides a flexible, easily handled laminated sheet.

The plastic and metal film unit appears, when lying on a backing surface, to be of an opaque nature, but normally when held up to a strong light source, it will be seen that the laminated unit so produced is actually relatively transparent, or translucent and passes an appreciable amount of light rays, particularly blue light rays, therethrough. This metal film itself can best be described as being of substantially microscopic thickness as it adds no readily measurable thickness to the original plastic film. The plastic film preferably is of the order of about .001 inch thick.

In the vacuum deposit of the metal forming the film in the laminated plastic-metal film used in practice of the invention, it is important that a relatively high vacuum be established in the metal deposit condition, and normally speaking, this vacuum is drawn twice in the metal deposit chamber with the chamber being filled with an inert gas, such as nitrogen, after the first vacuum is drawn so that when the second vacuum is established, any remaining atmosphere in such chamber tends to be formed from substantially only inert gas so that there is no oxidation of metal as it is being processed in and deposited in the vacuum deposited chamber. Theoretically, it is believed that the aluminum or other reflective metal particles being deposited first are atomized under the electrical and vacuum deposit conditions and that these atomized metal particles are in liquid form when they strike or impinge upon the plastic sheet. Theoretically, the best type of reflective surface would be provided when the metal particles would strike the plastic sheet and deposit thereon in a layer of metal particles one particle thick throughout. Thus I am endeavoring to secure a metal layer on the plastic film wherein the metal forms a continuous film but with the metal film thickness being measurable only by the finest types of a measuring equipment, and being only a few atoms or molecules thick, for example. The metal in the surface of the metal film contacting the plastic film, being deposited in an inert atmosphere and being in intimate contact with the plastic, will retain a highly reflective, non-oxidized surface.

To the laminated plastic-metal film, a layer of a thermoplastic, thermosetting type of a resin adhesive is attached and wherein the set adhesive still remains flexible or pliable under temperature ranges of up to about 290° F. and down to minus 80° F. Such resin could be of the nitrile rubber-phenol aldehyde type wherein the mixture is made up of 50 equal parts of such components by weight. The resin may be dissolved in a conventional solvent such as methylethyl ketone. One example of a suitable adhesive is the adhesive "Pliobond" made and sold by The Goodyear Tire & Rubber Company of Akron, Ohio. A thin layer of such adhesive is applied to the laminated plastic sheet on the metal layer 9 thereof and forms a part of the adhesive layer 7. The adhesive is then suitably dried and the plastic film 8 then, for example, could be formed into a roll for storage or handling purposes.

The metal base 6 likewise has a layer of adhesive applied to it. The adhesive used preferably is the same adhesive as that applied to the surface of the reflective metal film 9. While the adhesive applied to the base sheet 6 is heated, but prior to the complete setting thereof, preferably the adhesive layers on the base sheet 6 and plastic-metal film unit are brought together under pressure and some heat is applied to complete the bond between the plastic film and metal sheet while being pressed together. Thus the adhesive layers bond together to form a unitary adhesive layer 7. Thereafter, the entire laminated sheet 2 is suitably cooled and is ready for fabrication or other use, as desired.

Figure 3:
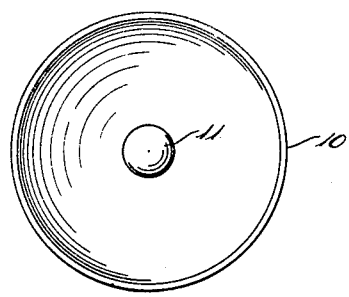
FIG. 3 is a front elevation of another typical headlight reflector unit of the invention.
Figure 4:
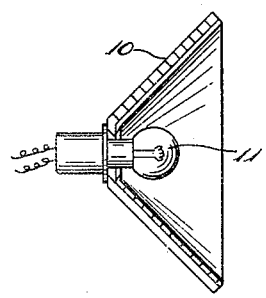
FIG. 4 is a vertical section of the head lamp reflector of FIG. 3.

The laminated sheet 2 provided by the invention, can be worked or shaped into a number of different types of reflectors and thus a conventional contoured conical type of a reflector 10 is shown in FIGS. 3 and 4. This conical reflector 10 is made from a laminated sheet like the sheet 2 only in this instance a portion of the sheet would be drawn to the conical shape desired. The transparent plastic film provided on the original base sheet is, in this instance, used as the inner surface of the conical reflector 10 and with the reflective metal layer, like the layer 9, being visible at all times through the plastic film 8. An electric bulb 11 is associated with this reflector 10 and has usual leads, socket and controls connected thereto, as desired.

By practice of the present invention, a substantially inert plastic surface has been provided on the base sheet in either the reflector 1 or the conical reflector 10. This transparent plastic film is resistant to corrosion by acids or bases, and is also resistant to oxidation and maintains its light transmitting properties over a long period of service life. Thus the reflective metal film 9 provided in the laminated sheet will retain its bright, reflective surface and condition for long periods of time and gives excellent service life in the reflector units of the invention.

The transparent polyester film used in practice of the invention has been tested and shown to have a refractive index of 1.64 (Abbe's Refracto-Meter). The film also has been tested and found to have a tensile strength of 23,500 p.s.i. when testing a film one mil thick. The film had a break elongation of 70 percent and a tensile modulus of 500,000 p.s.i. Thus the film is adapted to stand the conditions set up in shaping the original laminated base sheet to desired reflective material form. In many instances, substantially no deflection of the base laminated sheet is required in order to provide reflectors such as the reflector 2 shown in the drawings.

These reflective sheets of the invention can be made continuously, if desired, and can be made of any reasonable width or length.

Other types of film that can be used in the practice of the invention are those made from polyvinyl fluoride, and the film known as Teflon made by E. I. du Pont de Nemours & Company and which is called their Teflon FEP-fluorocarbon film. Such film is made from a polymer prepared from a polymerizing tetra-fluoro-ethylene and hexafluoropropene, as disclosed in an article published in April 1958 in "Materials in Design Engineering," page 171. Other similar inert material films can be used in the practice of the invention, but films made from cellophane, polyvinyl acetate and polyvinyl chloride, for example, cannot be used in practice of the invention. These films suitable for use in practice of the invention are made from inert, tough, resilient materials that retain their normal temperature characteristics and properties at a temperature of about 290° F. or higher. The films are only appreciably thermoplastic at temperatures clearly appreciably above 290° F.

One type of polyvinyl fluoride film available today and suitable for use in the practice of the invention is known as Teslar film made by the Du Pont Company.

Obviously the gage of the base sheet 6 used in the reflectors of the invention can be any desired thickness and any suitable metallic material can be used, although aluminum or its alloys are preferred because of their light weight. Thus it is believed that the objects of the invention have been achieved by the provision of a reflector article having very desirable light reflective properties over a long service life.

While two complete embodiments of the invention have been disclosed herein, it will be appreciated that modification of these particular embodiments of the invention may be resorted to without departing from the scope of the invention as defined in the appended claims.

What is claimed is:

1. A light reflector for use with fluorescent light fixtures that can be energized for long intervals, and which retains its physical characteristics and dimensional stability from room temperature up to at least about 290° F. comprising a contoured metal base sheet having a generally concave inner surface, a smooth continuous light reflective weather resisting surface layer on only the inner surface of said base sheet; said surface layer comprising a uniform continuous transparent inert thermoplastic film flexible at room temperature, about .001 inch thick, a vapor deposited uniform continuous unoxidized light reflective metal film directly bonded to and formed on the surface of said plastic film which is adjacent said base sheet and visible through said plastic film to form a uniform continuous light reflecting layer in the reflector, said metal film being thinner than said plastic film, said plastic film not being appreciably thermoplastic at temperatures below 290° F. and being made from a group of materials consisting of a polyester material, polyvinyl fluoride, and the copolymer of tetra-fluorethylene and hexafluoropropene; and a layer of thermosetting adhesive directly securing said metal base sheet to said metal film portion of said surface layer whereby an excellent light reflector operable over a wide temperature range is provided, which light reflector can be altered in shape by forces exceeding the elastic limits of said base sheet without breakage of said surface layer and said adhesive layer and without change of the uniform continuous construction of said surface layer.

2. A light reflector for use with fluorescent light fixtures that can be energized for long intervals, and which retains its physical characteristics and dimensional stability from room temperature up to at least about 290° F., said light reflector comprising a non-planar metal base sheet having a generally concave inner surface, a smooth continuous light reflective weather resisting surface layer on only the inner surface of said base sheet; said surface layer comprising a uniform continuous transparent inert thermoplastic plastic film flexible at room temperature about .001 inch thick, a vapor deposited uniform continuous unoxidized light reflective metal film directly bonded to and formed on the surface of said plastic film which is adjacent said base sheet and visible through said plastic film to form a uniform continuous light reflecting layer in the reflector, said metal film being thinner than said plastic film, said plastic film not being appreciably thermoplastic at temperatures below 290° F.; and a layer of thermosetting adhesive directly securing said metal base sheet to said metal film portion of said surface layer whereby an excellent light reflector operable over a wide temperature range is provided which light reflector can be altered in shape by forces exceeding the elastic limits of said base sheet without breakage of said surface layer and said adhesive layer and without change of the uniform continuous construction of said surface layer.

3. A light reflector comprising a base member having a generally concave inner surface, a smooth, continuous, light reflective surface layer on the inner surface of said base member, said surface layer comprising a continuous, transparent, inert, plastic film, flexible at normal atmospheric temperatures, and a vapor deposited uniform, continuous, light reflective metal film directly bonded to and formed on the surface of said plastic film, said surface layer being fixed to said base member to form a continuous light reflecting layer in the reflector, said plastic film being dimensionally stable at temperatures below 290° F.

4. A light reflector which retains its physical characteristics and dimensional stability from room temperature up to at least about 290° F., comprising a metal base sheet having a face surface, a smooth continuous light reflective weather resisting surface layer on only the face surface of said base sheet; said surface layer comprising a uniform continuous transparent inert thermoplastic film flexible at room temperature, a vapor deposited uniform continuous unoxidized light reflective metal film directly bonded to and formed on the surface of said plastic film which is adjacent said base sheet and visible through said plastic film to form a uniform continuous light reflecting layer in the reflector, said metal film being thinner than said plastic film, said plastic film being appreciably thermoplastic only at temperatures above about 290° F., and a layer of adhesive directly securing said metal base sheet to said metal film portion of said surface layer whereby an excellent light reflector operable over a wide temperature range is provided, which light reflector can be altered in shape by forces exceeding the elastic limits of said base sheet without breakage of said surface layer and said adhesive layer and without changing the uniform continuous construction of said surface layer.

References Cited by the Examiner
UNITED STATES PATENTS

| | | | |
|---|---|---|---|
| 1,959,931 | 5/34 | Schwartz | 240—103 |
| 2,414,657 | 1/47 | Mitchell | 240—103 |
| 2,682,605 | 6/54 | Asherman | 240—103 |
| 2,699,402 | 1/55 | Meyer | 154—43 |
| 2,702,580 | 2/55 | Bateman | 154—37 |
| 2,703,772 | 3/55 | Keithly | 154—96 |
| 2,728,703 | 12/55 | Kiernan et al. | 154—43 |
| 2,804,416 | 8/57 | Phillipsen | 154—43 |
| 2,812,270 | 11/57 | Alexander | 117—107 |

NORTON ANSHER, *Primary Examiner.*

J. D. BEIN, GEORGE NINAS, JR., LAWRENCE CHARLES, *Examiners.*